United States Patent

[11] 3,607,201

[72] Inventors: Vitaly Ippolitovich Zaborovsky
ul. Kalinina, 2/16;
Oleg Alexeevich Ivanov,
Demokraticheskaya ul. 10/3, kv. 53;
Anatoly Nikolaevich Savenkov, ul. Dimo,
17/1, kv. 46, all of Kishinev, U.S.S.R.
[21] Appl. No.: 876,193
[22] Filed: Nov. 28, 1969
[45] Patented: Sept. 21, 1971
Continuation of application Ser. No.
547,308, May 3, 1966, now abandoned.

[54] INSTALLATION FOR CASTING A MICROWIRE IN GLASS INSULATION
3 Claims, 5 Drawing Figs.

[52] U.S. Cl. .................................................. 65/162,
65/59, 65/60, 65/3, 65/160, 65/163, 65/164,
65/158, 65/DIG. 7
[51] Int. Cl. ...................................................... C03b,
C03b 25/02, C03b 29/00
[50] Field of Search .......................................... 65/158,
164, 163, 59, 60, 160, 3, DIG. 7, 162

[56] References Cited
UNITED STATES PATENTS

| | | | |
|---|---|---|---|
| 1,793,529 | 2/1931 | Taylor .......................... | 29/423 |
| 2,150,017 | 3/1939 | Barnard ........................ | 65/161 X |
| 3,037,241 | 6/1962 | Bazinet et al. ................ | 65/3 |
| 3,265,476 | 8/1966 | Roberson ..................... | 65/158 X |
| 3,269,816 | 8/1966 | Helbing ........................ | 65/158 X |
| 3,301,647 | 1/1967 | Shafer .......................... | 65/158 X |
| 3,362,803 | 1/1968 | Dahnöhl ....................... | 65/3 X |
| 3,294,504 | 12/1966 | Hick, Jr. ....................... | 65/3 |

Primary Examiner—Frank W. Miga
Attorney—Waters, Roditi, Schwartz & Nissen

ABSTRACT: An installation is provided for casting microwire in glass insulation, in which the charge metal and glass supplied into the microbath are melted with by means of a high-frequency generator inductor and the resultant microwire is wound on a receiving bobbin. The installation also comprises a device for controlling the linear resistance of the microwire adapted for use as a transmitter for correcting the operating conditions of microwire casting, such as the microwire reception speed and the microbath temperature.

PATENTED SEP 21 1971 3,607,201

INVENTOR

BY

ATTORNEYS

3,607,201

INSTALLATION FOR CASTING A MICROWIRE IN GLASS INSULATION

This application is a continuation of Ser. No. 547,308 filed May 3, 1966 now abandoned.

The present invention relates to the manufacture of a microwire in glass insulation directly from liquid phase of various metals and alloys, and more particularly to an installation for casting microwire in glass insulation.

Known at present are installations for casting a microwire in glass insulation, in which the charge metal and glass being supplied into a microbath are melted by means of the inductor of a high-frequency generator, and the microwire produced is directed to the receiving bobbin.

A disadvantage of the existing installations for casting the microwire in glass insulation is their low productivity, the absence of means for effecting the process inspection of the quality of the microwire obtained, its resistance per running meter or diameter of a strand, as well as the absence of means, ensuring the reproducibility of the casting process and the production of the microwire having the specified resistance per running meter.

An object of the present invention is to eliminate the above-mentioned disadvantages.

The specific object of the present invention is to provide an installation for casting a microwire in glass insulation, said installation being provided with means for effecting the inspection of the quality of the microwire, automatic correction of the processes of casting the microwire, as well as with means for the reproduction of specified optima conditions of the beginning stage of the process of forming the microwire, said conditions allowing of increasing the productivity and improving the quality of the microwire thus obtained.

These objects are accomplished due to the fact that the installation for casting the microwire in glass insulation, according to the present invention, is provided with a device for effecting the inspection of the resistance of the microwire per running meter in the process of its casting, said device being of such a design that it can be employed as a pickup device for correcting the conditions of the processes of casting the microwire. The device for effecting the inspection of the resistance of the microwire per running meter may be composed of a nonbalanced measuring bridge, one of the arms thereof being the input resistance of the bobbin with the microwire, connected to the bridge through a drop of molten metal of the microbath; a generator of sinusoidal oscillations with said bridge as a load, and an indicator of readings of the resistance of the microwire per running meter complete with a measuring instrument, calibrated according to the resistance per running meter or diameter of the strand of the microwire and connected to the measuring bridge. It is expedient to connect to the device for the inspection of the resistance per running meter the device for the automatic correction of the processes of casting of the microwire according to an adjuster of the resistance per running meter of the microwire, said latter device being a multicircuit system of independent control, each circuit of which actuates operating mechanisms of the installation, for example, a regulator of the speed of receiving the microwire and a regulator of temperatures conditions of the microbath.

It is also expedient to connect to the device for the automatic correction of processes of casting the microwire an adjuster of the volume of the microbath, said adjuster controlling the consumption of the microbath according to the specified value of the resistance of the microwire per running meter and to its discrete or continuous loading with charge metal.

Said adjuster of the microbath volume may be composed of a comparison block complete with a differential amplifier, one of the inputs thereof being impressed with a voltage proportional to the anode current of the generator tube of the high-frequency generator, while the other input with a rectified voltage, taken off from the terminals of the inductor of said generator; a recording instrument, connected to the comparison block, and a corrector of input conditions for the "zero" adjustment of the comparison block.

It is to be preferred to effect the continuous and discrete loading of the microbath with charge metal by means of a wide-range mechanism, comprising an electric drive, in particular with an electromagnetical amplifier to control the speed of its rotation; a multiple-stage reductor, functioning as a gear box, therefrom the power being taken off by two flexible shafts; at the ends of said shafts are provided, preferably by a rigid fixing, drawing rollers, upsetting the charge metal and being centered with relation to the microbath by means of a system of springs and a thrust screw, preferably provided with a conical neck on one of its ends.

In said wide-range mechanism the drawing rollers may be connected by means of ratchet couplings to the power takeoff shafts that are utilized to effect the hand correction of the supply of material, for example glass, while the thrust screw may be provided with a micrometric thread and with a clutch having the scale for controlling the diameter of the material to be upset.

The nature of the present invention may be made more fully apparent from a consideration of the following description of a preferred embodiment of the installation for casting the microwire in glass insulating, taken in conjunction with the appended drawings, in which.

Figure 1:
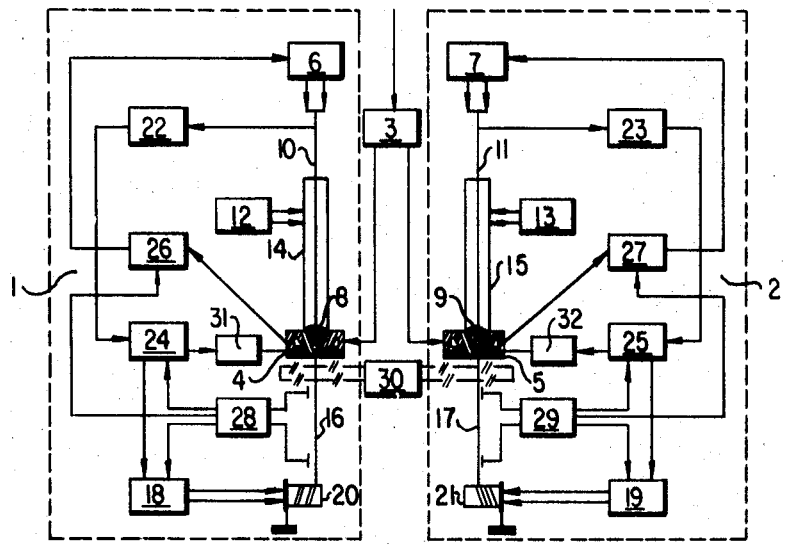
FIG. 1 represents a block system of the installation of the invention.

As it is evident from FIG. 1, the installation described comprises posts 1 and 2 for casting the microwire and an oscillatory circuit 3 of the high-frequency generator, ensuring the simultaneous operation of the posts 1 and 2. Said posts being similar and arranged symmetrically, operate simultaneously and comprise the following main units: melting inductors 4, 5; wide-range mechanisms 6, 7 for effecting the discrete and continuous loading of microbaths 8, 9 with charge metal 10, 11; wide-range mechanisms 12, 13 for the continuous supply of glass pipes 14, 15 being employed as a starting material for the formation of insulation of microwire 16, 17; receiving mechanisms 18, 19, ensuring the rotation of receiving bobbins 20, 21, their replacement and reciprocal movement in order to effect the uniform laying of the microwire on the bobbins 20, 21; devices 22, 23 for controlling the linear resistance (per running meter) of the microwire; devices 24, 25 for effecting the correction of conditions of the casting process; adjusters 26, 27 of the volume of the microbath; radio transmitting and receiving sets 28, 29, controlling the presence and integrity of the microwire strand in the insulation; an oil pump 30, ensuring the cooling of the microwire, and vacuum pumps 31, 32.

From what has been said above, it is evident that the posts 1, 2 for casting the microwire are similar in their design; therefore, let us consider the operation of only one post of the installation.

Figure 2:
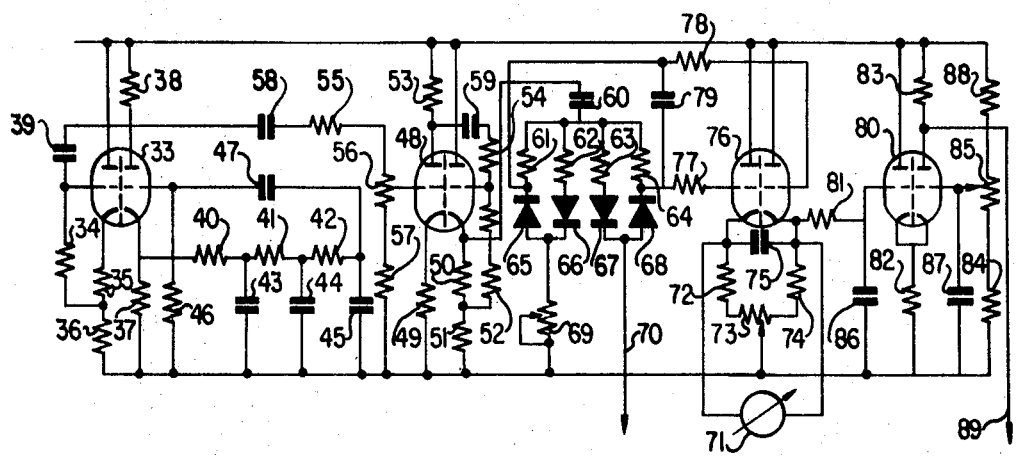
FIG. 2 is a schematic electrical diagram of the device for controlling the linear resistance (per running meter) of the microwire.

The oscillatory circuit 3 of the high-frequency generator ensures an independent supply of the inductor 4, which is made use of to melt and maintain in a suspended state the lower portion of the glass pipe 14 accommodating a batch of metal in the form of the microbath 8. The microwire 16 in the form of a glass capillary with metal filling is formed out of the microbath 8, said microwire being received by the bobbin 20, which is imparted the rotary and reciprocal movements by the receiving mechanism 18. On the way to the receiving bobbin 20, the microwire 16 passes through a stream of oil supplied by the oil pump 30. Simultaneously, within the same section, the presence of metal and integrity of the strand of the microwire 16 in its glass insulation is controlled by means of the radio transmitting and receiving set 28, which provides for the light and sound signalling of the integrity of the microwire strand and permits the operation of automatic control systems. After setting up a stable process of casting the microwire, the device 22 for controlling the linear resistance (per running meter) of the microwire is actuated in the installation. As it is evident from FIG. 2, said device comprises a generator of sinusoidal oscillations, provided with a tube 33, resistors 34, 35, 36, 37, 38, a condenser 39, and a three-link, phase-rotating circuit, consisting of resistors 40, 41, 42, 46 and condensers 43, 44, 45, 47; and amplifier, comprising a tube 48, resistors 49, 50, 51, 52, 53, 54, 55, 56, 57 and condensers 58, 59; an unbalanced measuring bridge, consisting of a condenser 60, resistors 61, 62, 63, 64, diodes 65, 66, 68, a potentiometer 69 and an input resistance 70 of the microwire complete with a bobbin, said resistance being one of the arms of said measuring bridge; an inductor, comprising a measuring instrument 71, connected to said bridge via resistors 72, 73, 74 and a condenser 75 of a balanced stage with a cathode-loaded tube 76 and resistors 77, 78 complete with a condenser 79.

When measuring the linear resistance (per running meter) of the microwire 16, the generator of sinusoidal oscillations and amplifier supply the unbalanced measuring bridge, at the output of which there is produced a voltage, depending on the linear resistance of the microwire and measured through the balanced stage by means of a measuring instrument 71 set to infinity with the aid of the potentiometer 69.

The instrument 71 is a self-recording millimeter provided with a scale calibrated in kilohms per meter or in microns of the diameter of the microwire strand.

Besides, said device 22 is provided with the differential amplifier complete with a tube 80, resistors 81, 82, 83, 84, 85 and condensers 86, 87, connected with one of its inputs to the balanced stage of an indicator, and with another input, to an adjuster 88 of the linear resistance of the microwire.

The voltage taken off from the measuring bridge by means of said differential amplifier through the output 89 is utilized for supplying a signal to the device 24 for the correction of conditions of the process of casting of the microwire.

Figure 3:
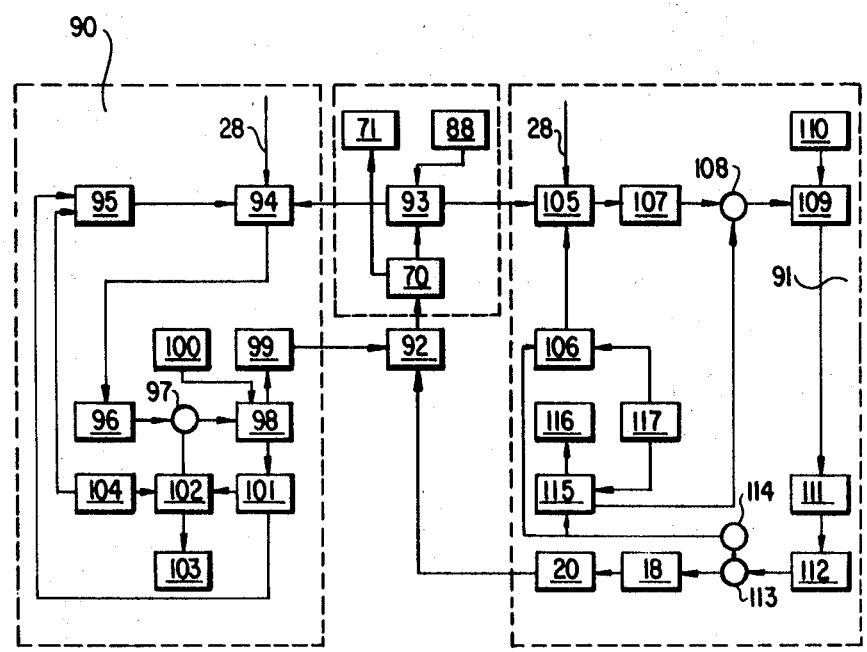
FIG. 3 is a block diagram of the device for correcting conditions of the casting process.

The device 24 is intended for the automatic maintaining of the value of the linear resistance of the microwire obtained within the ranges of the specified value, and is composed of a circuit 90 (FIG. 3), correcting the temperature of the microbath 8, and a circuit 91, correcting the speed of reception of the microwire by the receiving bobbin 20. The circuits 90 and 91 affect an object 92 to be controlled, and are operated by one common device for controlling the linear resistance through a comparison diagram 93.

The circuit 90 comprises a commutating device 94 of starting conditions, connected to a comparison diagram 95 and a universal amplifier 96, and a reversible electric motor 97, connected to a reductor 98 and a regulator 99 (in the form of a valve). A regulator 100 for the manual control is also connected to the reductor 98. The regulator 99 is also connected by means of the reductor 98 to a feedback potentiometer 101. For limiting the ranges of temperature control, the circuit 90 is provided with a pressure limiter 102, connected to a light indicator 103 and a pressure adjuster 104.

The circuit 91 comprises a commutating device 105 of starting conditions, connected to a comparison diagram 106 and a universal amplifier 107, a reversible electric motor 108, a reductor 109, a hand regulator of speed 110, a regulator 111 for the automatic control of speed, and an electromagnetical amplifier 112 of the electric motor 113 for the receiving mechanism 18 of the bobbin 20.

The circuit 91 is also provided with an electric motor 113, coaxially connected to a tachometer generator 114, a limiter 115, a light indicator 116 for limiting the speed, and an adjuster 117 of speed.

The autonomous control of conditions of the process of casting the microwire on the basis of one pickup device and an output characteristic of the linear resistance of the microwire is provided by the fact that conditions utilized for effecting the control are independent from each other.

In conformity with the specified conditions of the process of casting the microwire, the process conditions may be adjusted according to said procedures by means of the circuits 90 and 91 in any sequence of operations or according to both types of procedures simultaneously.

The correction of process conditions is effected with the aid of an astatic system of control in the circuits 90, 91. The dead zone in the system is defined by a selected coefficient of the amplification of system, which fact simplifies the solution of subsidiary problems, in particular the adjustment and storage of starting conditions and the return of the system in to its original state in case of the microwire strand being torn off.

When operating the device 24, the comparison diagram 93 produces a mismatch signal between the current and specified values of the linear resistance of the microwire, and the mismatch signal from the comparison diagram 93 is supplied simultaneously to both correction circuits. Under "operating conditions" the mismatch signal is supplied via the commutating devices 94, 105 to inputs of the universal amplifiers 96, 107, which results in setting in motion of the reversible electric motors 97, 108 that, in its turn, actuate the operating mechanisms, for example, via the reductor 98 the regulator 99 of the vacuum pump 31, controlling the temperature conditions of the microbath 8 in such a manner that the mismatch signal of the current resistance will be reduced to the specified value, that is to say, to zero, or that, when actuating via the reductor 109 the regulator 111 by means of the magnetic amplifier 112 by varying the speed of the electric motor 113 of the reception mechanism 18 and bobbin 20, there will be achieved the same result.

When adjusting starting conditions of operation, signals are supplied from the output of comparison diagrams 95, 106 via commutating devices 94, 105 to universal amplifiers 96, 107.

When the installation operates according to a pattern of the automatic correction of process conditions, in case of any tearing off of a strand of the microwire 16, the commutating devices 94, 105 after having received a signal from the device 28 connect the inputs of the amplifiers 96, 107 to the comparison diagrams 95, 106 that have stored up the input starting conditions of operation.

Owing to this, the system returns into its original state. Such an operation is required for the preservation of a range of control of process conditions when receiving a new bobbin of the microwire, and for the simultaneous replenishment by dose melting of the microbath with the charge metal up to its original volume by means of the adjuster 26 of the volume of the microbath 8.

In conformity with the process conditions, the correction of procedures of casting the microwire is effected within definite specified ranges.

The ranges of the correction are limited by means of the pressure limiter 102 and speed limiter 115 by supplying to one of their inputs a signal proportional to the current value of a factor being controlled, while other inputs are receiving a signal from the pressure adjuster 104 and speed adjuster 117, said signal being proportional to original values of the factors being controlled.

When the absolute value of the current factor exceeds the specified zone of the correction as compared with the originally specified value, the limiting units disconnect the operating mechanisms 97, 108, and the indicators 103, 116 emit signals about the depletion of the correction system.

Figure 4:
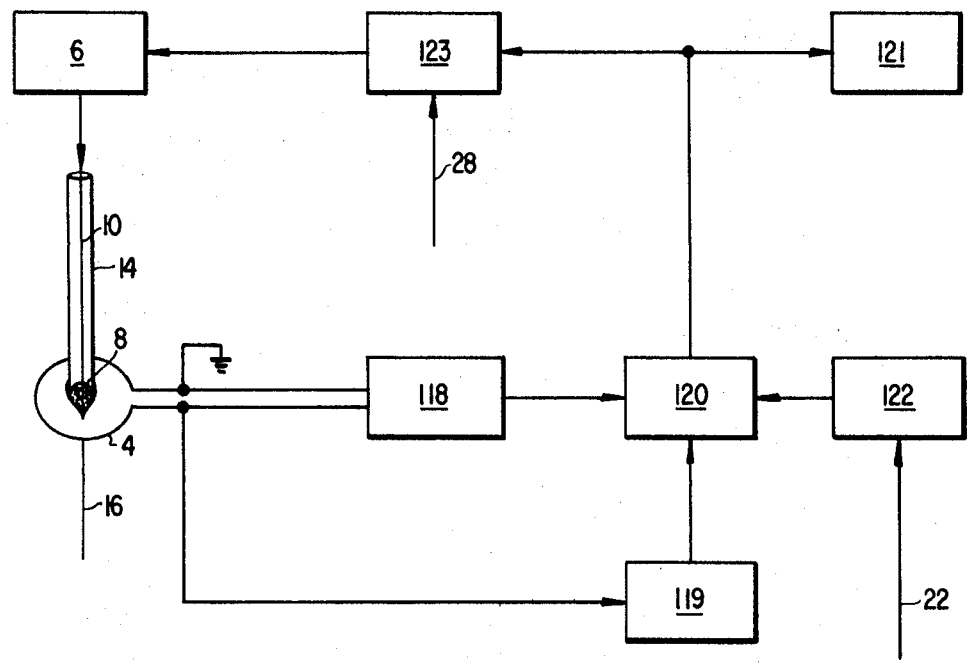
FIG. 4 is a block diagram of the adjuster of the volume of the microbath.

The adjuster 26 of the volume of the microbath 8 is connected to the device 22 and device 24 through the adjuster 88 of linear resistance (per running meter), and, as it is evident from FIG. 4, it comprises a system "microbath 8—inductor 4," supplied by the high-frequency generator 118; a rectifier 119, connected to terminals of the inductor 4; a comparison block 120; a recording instrument 121; a corrector 122 of input conditions and a relay block 123, connected to a wide-range mechanism 6 and the device 28.

The adjuster 26 of the volume of the microbath 8 ensures in the installation the reproducibility of the adopted optima conditions of the process of casting the microwire, said conditions being stipulated by the volume of the microbath 8. The operation of the adjuster 26 is based on the principle that under otherwise equal conditions, in melting metals in a suspended state by high-frequency currents, the voltage on terminals of the melting inductor 4 is proportional to the volume of metal introduced into the inductor 4, as well as on the fact that for producing the microwire of a corresponding linear resistance, the casting process must be carried out with a corresponding volume of the microbath 8. In connection with this fact, the adjuster 26 is matched with the adjuster 88 of the linear resistance of the microwire of the device 22.

The adjuster 26 of the volume of the microbath 8 is actuated after adjusting the process of manufacturing the microwire and the original charging of the microbath 8 with a specified batch of metal.

The voltage taken off from the terminals of the inductor 4, supplied by the high-frequency generator 118, is applied via the rectifier 119 to one input of the differential amplifier of the comparison block 120, on the second input of which is impressed the voltage proportional to the anode current of the generator tube of the high-frequency generator 118. Simultaneously, the comparison block 120 is zero adjusted by means of the corrector 122 of input conditions.

Figure 5:
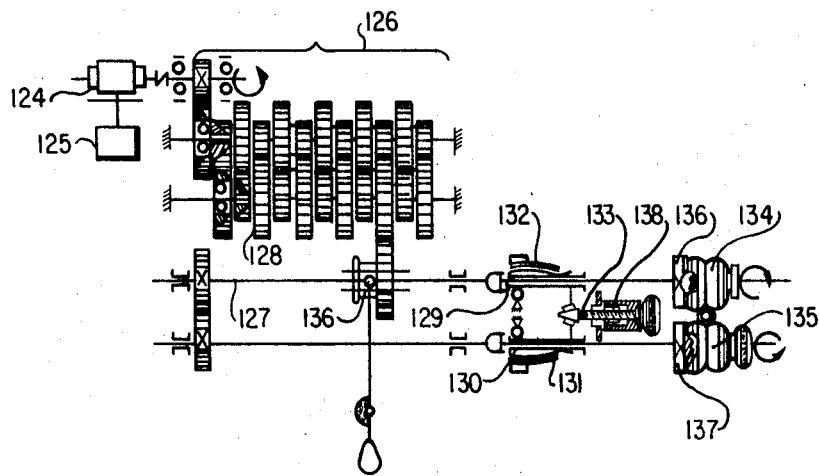
FIG. 5 is a kinematical diagram of the wide-range mechanism for supplying the charge metal.

Subsequently, the variation of the voltage on terminals of the inductor 4, resulting from the variation of the volume of the batch of metal of the microbath 8, is recorded by the instrument 121, and in the case of depletion of the microbath 8 to a value, limited by the adjuster 88 of linear resistance of the device 22, or in the case of tearing off of the microwire strand the device 28 actuates the relay block 123, putting thereby into operation the wide-range mechanism 6, ensuring the charging of the microbath 8 with charge metal 10 until the full adjustment of the comparison block 120. Said wide-range mechanism 6 comprises an electric motor 124 (FIG. 5), controlled by the magnetic amplifier 125; a multiple-stage reductor 126, functioning as a gear box from which the power is taken off the shafts 127, 128 provided with an articulated joint; sliding bearings 129, 130 of an elongated design rotatable about an axis in the horizontal plane of the mechanism; springs 131, 132, pressing the bearings 129, 130 about the thrust screw 133 with the conical neck; drawing roller 134, 135, and gears 136 for the changeover of speeds of the supply of the charge metal.

The wide-range mechanism 6 may be employed both for the continuous and discrete charging of the microbath 8 with the charge metal. When charging the microbath 8 with metal of high ductility in as molten state, said mechanism 6 operates synchronously with the wide-range mechanism 12 for the supply of glass and the mechanism for the reception of the microwire, and provides thereby the continuous process of casting the microwire.

In case of charging the microbath 8 with metal of a decreased ductility, the mechanism 6 ensures the discrete loading of the microbath 9 as it depletes completely or partially.

The charge metal is supplied into the microbath 8 with drawing rollers 134, 135 that are centered with relation to the microbath 8 and thrust screw 133 by means of springs 131, 132, the articulated portion of the shafts 127, 128 and sliding bearings 129, 130, rotatable about their axis in the plane of the mechanism. The selection of the speed of supply of the charge metal is effected by changing over the gear 136, with the difference in speed between each stage being selected by means of the magnetic amplifier 125 due to a corresponding variation of the speed of the electric motor 124.

With the drawing rollers 134, 135 being loosely fitted on the power takeoff shafts 127, 128 and linked with said shafts by means of clutches 136, 137, the wide-range mechanism 6 may be employed as the wide-range mechanism 12 for the continuous supply of glass.

In the wide-range mechanism 12, when mounting the thrust screw 133 together with the measuring scale on a clutch 138 there is provided the possibility of the control measurement of the diameter of the employed glass pipe 14 during its mounting.

The described installation provides the possibility of manufacturing the microwire in glass insulation directly from the liquid phase of different metals and alloys with a continuous control and a high productivity of the manufacturing process.

We claim:

1. An installation for casting a microwire in glass insulation, comprising a melting inductor for melting and maintaining in a suspended state a batch of metal in the form of a microbath, a glass pipe containing said inductor; an oscillating circuit coupled to and energizing said inductor; means for supplying glass into a zone of said inductor; a reception mechanism including bobbins receiving the microwire being produced; means for cooling said microwire, a device coupled to the reception mechanism for controlling the linear resistance of said microwire, said device for controlling the linear resistance of said microwire comprising an unbalanced measuring bridge, one of the arms of which is the input resistance of said bobbin with said microwire, said resistance being connected to said bridge through a drop of molten metal in said glass pipe; a generator of sinusoidal oscillations connected with said measuring bridge as a load, and an indicator for the values of the linear resistance of said microwire, provided with a measuring instrument calibrated according to the linear resistance of said microwire and connected to said measuring bridge, correction means for the automatic correction of casting of said microwire connected to the device which controls the linear resistance of the microwire, said correction means comprising a multicircuit system with an independent control, each circuit of which actuates operating mechanisms of the installation, including a regulator of speed of reception of said microwire and a regulator of temperature conditions in said microbath, adjuster means for the volume of said microbath connected to said correction means for controlling the consumption of said microbath according to the linear resistance of said microwire and its continuous or discrete leading with charge metal; said adjuster means comparison block with a differential amplifier, to one input of which is impressed a voltage proportional to the anode current of a generator tube of said high-frequency generator, while to another input is applied a rectified voltage taken from the terminals of said inductor, a recording instrument connected to said comparison block, and a corrector of input conditions for zero adjusting of said comparison block.

2. An installation as claimed in claim 1 comprising a range mechanism for the continuous or discrete loading of said microbath with charge metal, said mechanism comprising an electric motor, with a magnetic amplifier for controlling the speed of rotation of said electric motor, a multiple-stage reductor employed as a gear box, wherefrom power is taken off by two flexible shafts, at the ends of which are arranged rigidly fitted drawing rollers, upsetting the charge metal and centered with relation to said microbath by means of springs and a thrust screw provided with a conical neck on one of its ends.

3. An installation as claimed in claim 2 wherein said wide-range mechanism comprises power takeoff shafts with ratchet couplings connecting said shafts to said drawing rollers for the manual correction of the supply of material, said thrust screw being provided with a micrometric thread and a clutch with a scale for measuring the diameter of the material being upset.